(12) United States Patent
Kim

(10) Patent No.: US 8,041,400 B2
(45) Date of Patent: Oct. 18, 2011

(54) EVENT DISPLAY METHOD AND APPARATUS FOR MOBILE TERMINAL

(75) Inventor: Min-Joo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 798 days.

(21) Appl. No.: 12/036,375

(22) Filed: Feb. 25, 2008

(65) Prior Publication Data

US 2008/0209546 A1    Aug. 28, 2008

(30) Foreign Application Priority Data

Feb. 27, 2007  (KR) .......................... 10-2007-0019856

(51) Int. Cl.
*H04Q 7/32* (2006.01)
(52) U.S. Cl. ...................... 455/566; 455/550.1; 455/557; 455/556.1; 455/556.2; 455/90.3; 345/162; 345/440; 345/440.2; 345/156; 345/157
(58) Field of Classification Search .................. 455/566, 455/550.1, 557, 556.1, 556.2, 90.1–90.3, 455/414.1–414.4, 575.1; 345/346, 440, 440.2, 345/156, 157, 162
See application file for complete search history.

(56) References Cited

U.S. PATENT DOCUMENTS

| | | |
|---|---|---|
| 5,977,974 A | 11/1999 | Hatori et al. |
| 2002/0054117 A1* | 5/2002 | van Dantzich et al. ........ 345/766 |
| 2003/0013434 A1* | 1/2003 | Rosenberg et al. ............ 455/414 |
| 2005/0075097 A1* | 4/2005 | Lehikoinen et al. ....... 455/414.1 |
| 2006/0026521 A1 | 2/2006 | Hotelling et al. |
| 2006/0148528 A1* | 7/2006 | Jung et al. ..................... 455/566 |

FOREIGN PATENT DOCUMENTS

| | | |
|---|---|---|
| EP | 1650690 A1 | 4/2006 |
| JP | 2005-309810 A | 11/2005 |
| WO | WO 2005/043373 A1 | 5/2005 |
| WO | WO 2006/070253 A2 | 7/2006 |

* cited by examiner

*Primary Examiner* — Keith Ferguson
(74) *Attorney, Agent, or Firm* — Birch, Stewart, Kolasch & Birch, LLP

(57) ABSTRACT

Disclosed is an event display method and apparatus for a mobile terminal, which displays events occurring in a mobile terminal on a multi time graphic (divided into a plurality of time graphics), thereby enabling easy checking and management of various types of events. For this, the event display method includes detecting at least one or more events in a mobile terminal, displaying a multi time graphic divided into a plurality of time graphics on a display screen, and locating the detected events on the multi time graphic.

10 Claims, 15 Drawing Sheets

FIG. 11F (Indicator)

← VIP | DAY | TIME RANGE →

MONDAY
TUESDAY
WEDNESDAY
THURSDAY
FRIDAY
SATURDAY

ORIGINATING CALLS 11 HOURS 12 MIN. 01 SEC.
INCOMING CALLS 9 HOURS 12 MIN. 19 SEC.

CLOSE | INITIALIZATION

FIG. 11G (Indicator)

← VIP | DAY | TIME RANGE →

06~09
09~12
12~15
15~18
18~21

30 MESSAGES SENT
15 MESSAGES RECEIVED

CLOSE | INITIALIZATION

EVENT DISPLAY METHOD AND APPARATUS FOR MOBILE TERMINAL

BACKGROUND

The present invention relates to a mobile terminal, and more particularly, to an event display method and apparatus for a mobile terminal.

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Related art mobile terminals (e.g., a mobile phone, a personal digital assistant (PDA), etc.) record events such as phone calls or missed calls into a call list, and record events such as sent and received messages into a message storage file. In addition, the related art mobile terminals record schedule events in a scheduler, and record events such as an alarm and a wake-up call in a menu storage file.

However, since the related art mobile terminals record each of such various events in a dispersed (scattered) manner, thereby presenting difficulty for a user desiring to conveniently check and manage information about various events.

SUMMARY

Therefore, it is an object of the present invention to provide an event display method and apparatus for a mobile terminal, which displays various events occurring in a mobile terminal on a multi time graphic divided into a plurality of time graphics, thereby enabling a user to easily check and manage information about the events.

To achieve this and other advantages and in accordance with the purposes of the present invention, as embodied and broadly described herein, there is provided an event display method for a mobile terminal, including steps of: detecting at least one or more events in a mobile terminal, displaying a multi time graphic divided into a plurality of time graphics on a display screen, and locating the detected events on the multi time graphic.

There is further provided an event display apparatus for a mobile terminal, including: a detector unit which detects at least one or more events in a mobile terminal, and a controller which displays a multi time graphic divided into a plurality of time graphics on a display screen, and locates the detected events on the multi time graphic.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 11A through 11H are exemplary views respectively illustrating information of detected events in a cylindrical graph according to one embodiment of the present invention.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
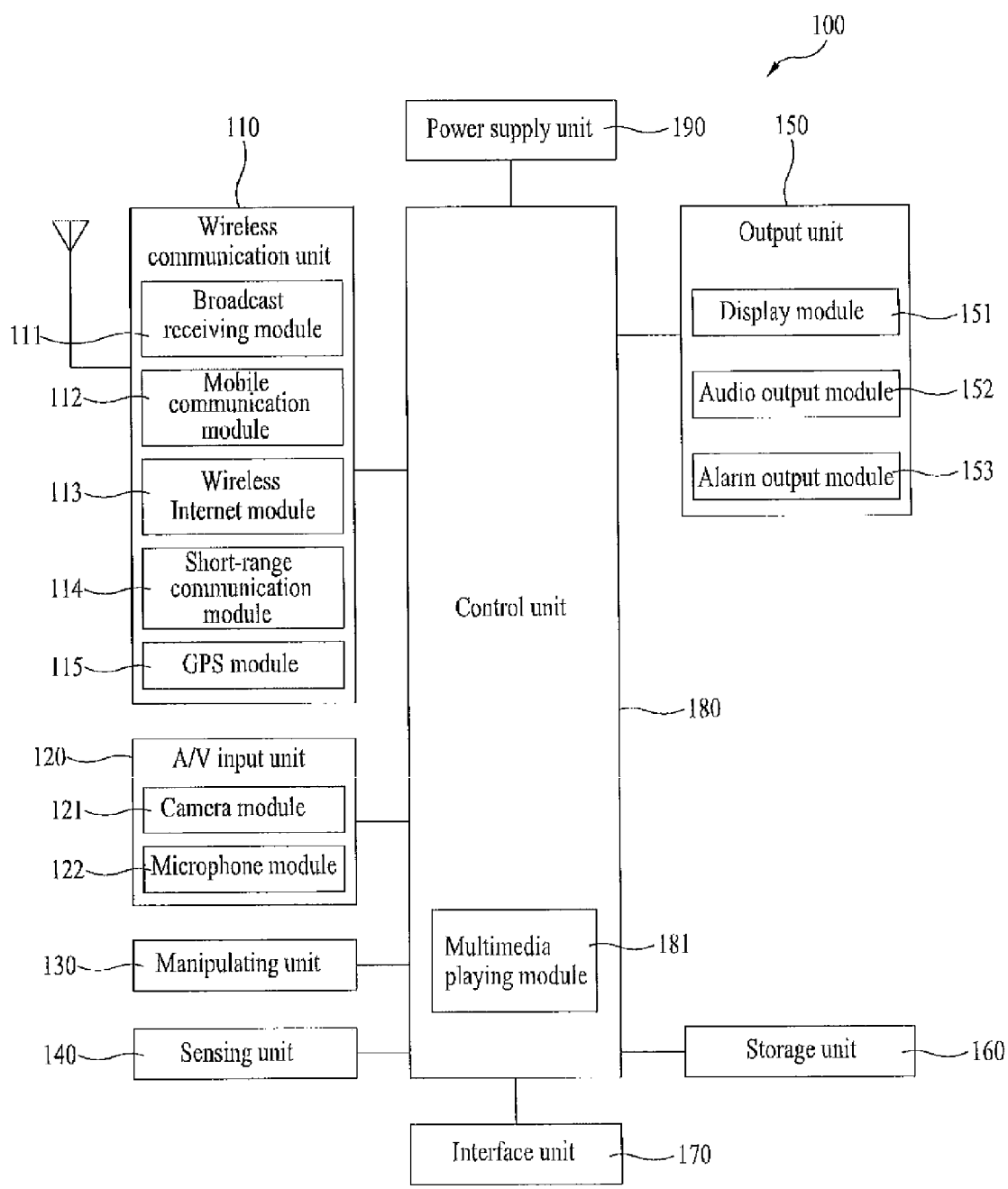
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof. The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device The control unit 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module may be configured as part of the control unit 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, other electronic units designed to perform the functions described herein, or a selective combination thereof. In some cases, such embodiments are implemented by control unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, control unit 180).

Mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal. However such teachings apply equally to other types of terminals.

Figure 2:
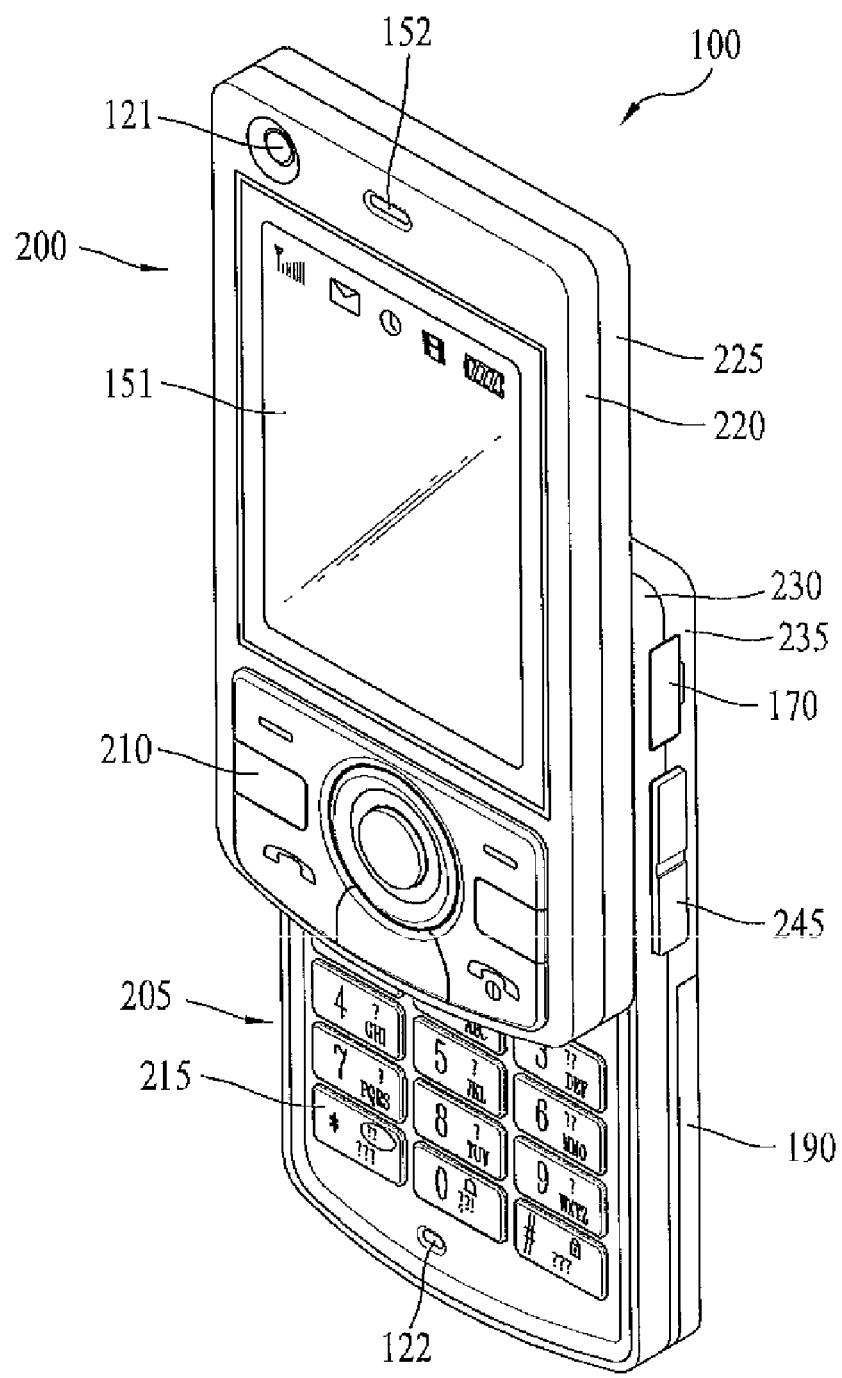
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) is implemented using function keys 210 and keypad 215. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
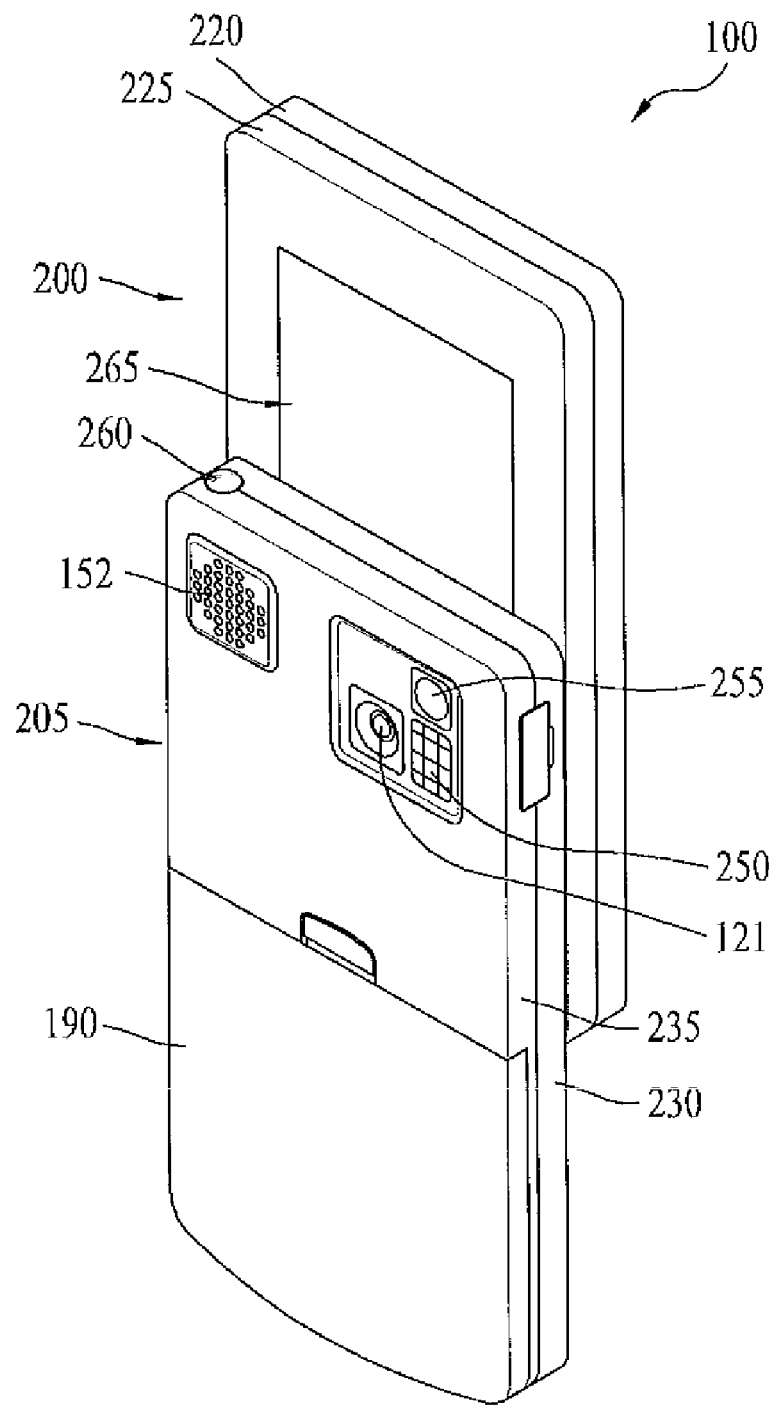
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
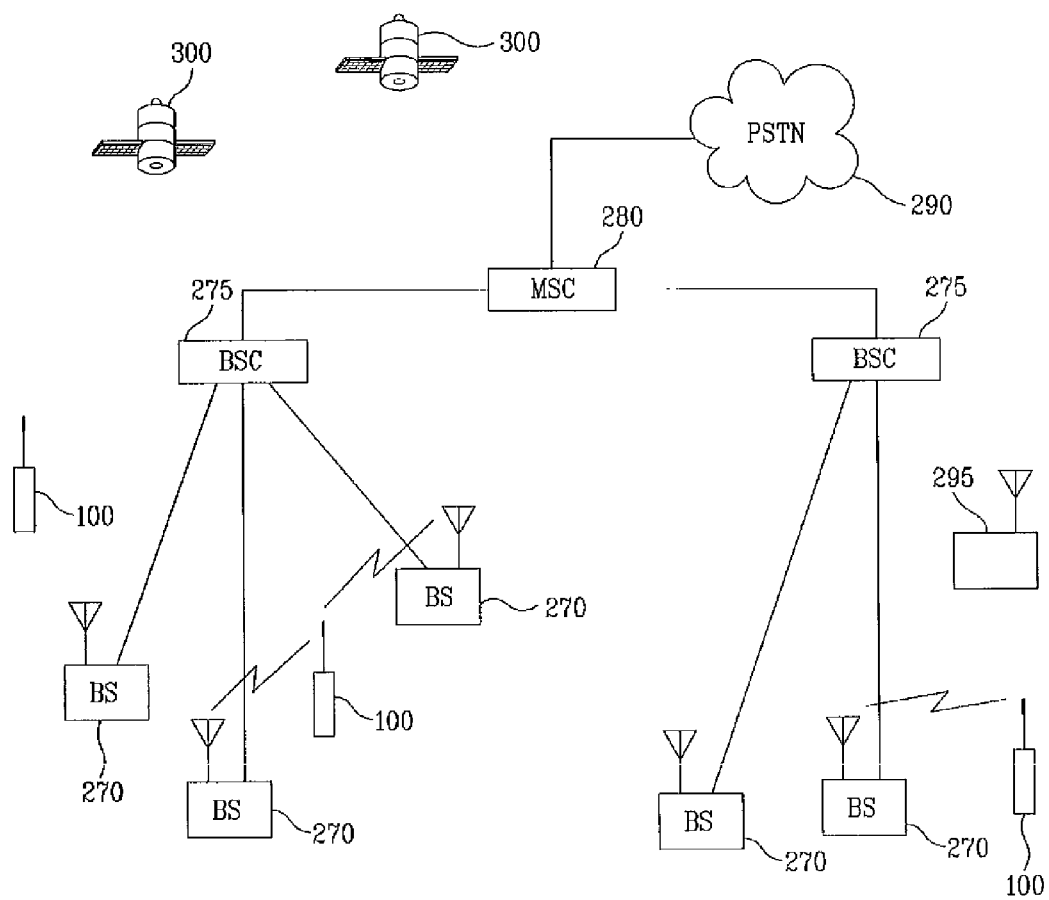
FIG. 4 is a block diagram of a CDMA wireless communication system operable with the mobile terminal of FIGS. 1-3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IPF, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

Figure 5:
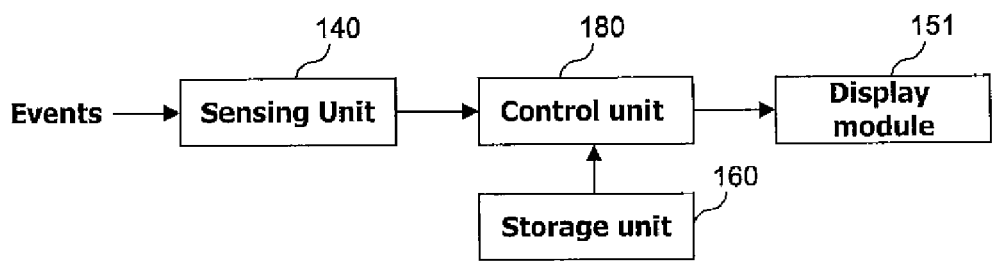
FIG. 5 is a block diagram showing a configuration of an event display apparatus for a mobile terminal according to one embodiment of the present invention.

FIG. 5 is a block diagram showing the configuration of an event display apparatus for a mobile terminal according to one embodiment of the present invention. The event display apparatus for a mobile terminal according to one embodiment of the present invention may be applied to a mobile terminal, such as a portable phone, a personal digital assistant (PDA), a portable multimedia player (PMP), an MP3 player, and the like.

As shown in FIG. 5, the event display apparatus for a mobile terminal according to one embodiment of the present invention includes a sensing unit 140 that detects (or senses) various types of events generated in a mobile terminal, and a control unit 180 that displays a multi time graphic pre-stored in a storage unit 160 and divided into a plurality of time graphics on a display 151 of the mobile terminal, and locates the detected events on the multi time graphic. The term "event" as used herein refers to various events occurring in a mobile terminal, and signifies operations performed for informing a user of the mobile terminal about a call reception/transmission, about a missed call, about messages sent and received, about a schedule/alarm/wake-up call, and the like. The so-called "multi time graphic" (which refers to a particular type of graphical format that allows the user to easily view time related information) may include a plurality of time lines. The plurality of time lines may indicate real time. The size, shape, width and color of the plurality of time lines may be variously modified.

The control unit 180 displays the detected events on a time line of the multi time graphic based on time information of the detected events. For instance, if a detected event has occurred at 5:00 pm, the control unit 180 displays the detected event at the position of 5:00 pm of a specific time line of the multi time graphic.

The control unit 180 may provide control to display a circular-shaped multi time graphic on the display module 151, display a multi time graphic in a chart format on the display module 151, or display a spiral (or other geometric) multi time graphic on the display module 151.

The control unit 180 may provide control to display the events detected by the sensing unit 140 on the circular multi time graphic, on the chart-type multi time graphic, or on the spiral multi time graphic. For instance, the control unit 180 may provide control to display the respective events as icons (or other graphical indicators), and then locates each of the displayed icons at appropriate locations on the multi time graphic. Accordingly, the events (that are represented by icons) located on the multi time graphic have a certain time order or sequence. Here, the control unit 180 may display each icon on the multi time graphic or at locations adjacent to the multi time graphic.

Hereinafter, description of the operation of the event display apparatus for a mobile terminal according to one embodiment of the present invention will be given in detail.

First, when an operation mode of the mobile terminal is changed into an event display mode by a user, the sensing unit 140 detects various types of events occurring (or stored) in the mobile terminal, and then outputs the detected events to the control unit 180. For instance, the sensing unit 140 detects call reception/transmission events (e.g., voice or telephony calls originated/received), missed call events, message reception/transmission events, events such as schedule/alarm/wake-up call/tasks/D-day, anniversary notification events, DMB (Digital Multimedia Broadcasting) viewing reservation events, important memo events, reserved message events, and then outputs the detected events to the control unit 180.

When one of the multi time graphics is selected by the user among the circular multi time graphic, chart-type multi time graphic, and spiral multi time is graphic, the control unit 180 displays the selected multi time graphic on the display module 151, and displays the detected events on the displayed multi time graphic.

For instance, if a circular multi time graphic is selected by the user, the control unit 180 displays the selected circular multi time graphic on the display module 151, and then locates icons corresponding to the detected events on the circular multi time graphic displayed on the display module 151. If a chart-type multi time graphic is selected by the user, the control unit 180 displays the selected chart-type multi time graphic on the display module 151, and then locates the icons corresponding to the detected events on the chart-type multi time graphic displayed on the display module 151. If the spiral multi time graphic is selected by the user, the control unit 180 displays the selected spiral multi time graphic on the display module 151, and then locates the icons corresponding to the detected events on the spiral multi time graphic displayed on the display module 151.

When a particular icon located on the multi time graphic is selected by the user, the control unit 180 executes a (software) program (or codes, instructions, etc.) linked to (or associated with) the selected particular icon. Various procedures for executing the icon-linked programs may be employed. Hereinafter, description of the method for displaying events on the circular multi time graphic by using the event display apparatus for a mobile terminal according to one embodiment of the present invention will be given in detail with reference to FIG. 6.

Figure 6:
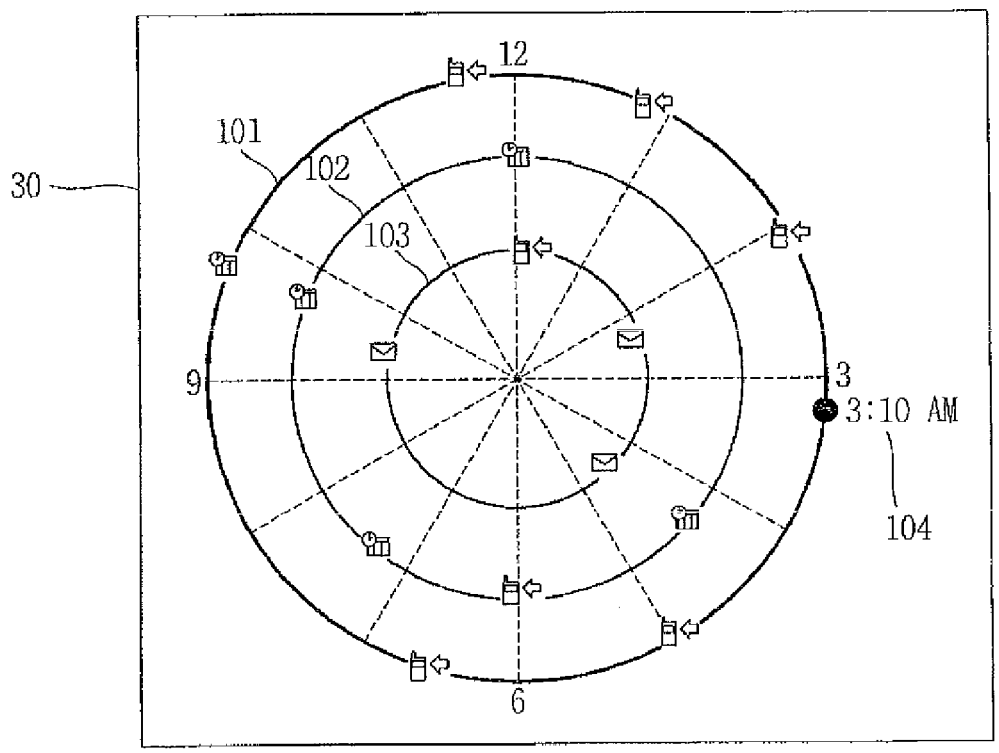
FIG. 6 is an exemplary view illustrating a method for displaying various events on a circular multi time graphic by using the event display apparatus for a mobile terminal according to one embodiment of the present invention.

FIG. 6 is an exemplary view illustrating a method of displaying various types of events on a circular multi time graphic (e.g., a multi time graphic divided into 12 time graphics) by using the event display apparatus for a mobile terminal according to one embodiment of the present invention.

As shown in FIG. 6, the control unit 180 displays a multi time graphic having circular time lines 101~103 selected by the user on the display module 151. In addition, the control unit 180 displays icons linked to the events detected by the sensing unit 140 on each of the circular shape time lines.

The multi time graphic may include a plurality of circular time lines 101~103 indicating particular time value, and each time line is divided into a plurality of quadrants (e.g., 4, 8, 12). Here, the control unit 180 may locate the icons indicating the call reception events on the first time line 101, the icons indicating the schedule reception events on the second time line 102, and the icons indicating message events on the third time line 103. Here, the first to third time lines may be set to have a different size, a different shape and a different color, respectively. The width of each of the first to third time lines may be set differently. Further, the control unit 180 may locate events selected according to a user's request on the time line selected by the user.

The control unit 180 displays a current time 104 on the multi time graphic. The current time may also be displayed on one or more of the time lines. In addition, as time elapses, the control unit 180 may change the size (or other graphical characteristics) of respective events (icons) displayed on the display module 151. For instance, when a reserved time of a schedule event located on the time line approaches, the control unit 180 may gradually increase or reduce the size of the icon of the schedule event such that more intuitive and visually appealing graphics are displayed.

When the user locates a cursor (or other indicator) on a particular icon (e.g., the schedule icon), the control unit 180 displays summary information of the schedule icon through a pop-up window (or other viewable format) on the display module 151. Then, when the user clicks (or otherwise activates) the certain icon, the control unit 180 may display detailed information of the schedule icon on the display module 151.

When an up/down direction key (not shown) disposed on a keypad (not shown) is selected by the user, the control unit 180 is configured to move the cursor from one circular time line to another circular time line. Accordingly, the user can select a desired circular time line by using the up/down direction key or other manipulation means.

When a right/left direction key (not shown) disposed on the keypad is selected (or operated) by the user, the control unit 180 is configured to move the cursor along the circular time line. Accordingly, the user can select the icon located on the desired circular time line by using the right/left direction key, thereby easily checking and managing the particular event. Here, the control unit 180 may select an icon requested by the user via a touch screen or display a time line requested by the user on the touch screen.

Hereinafter, description of the multi time graphic having a plurality of time lines according to one embodiment of the present invention will be given in detail with reference to FIGS. 7A and 7B.

Figure 7A:
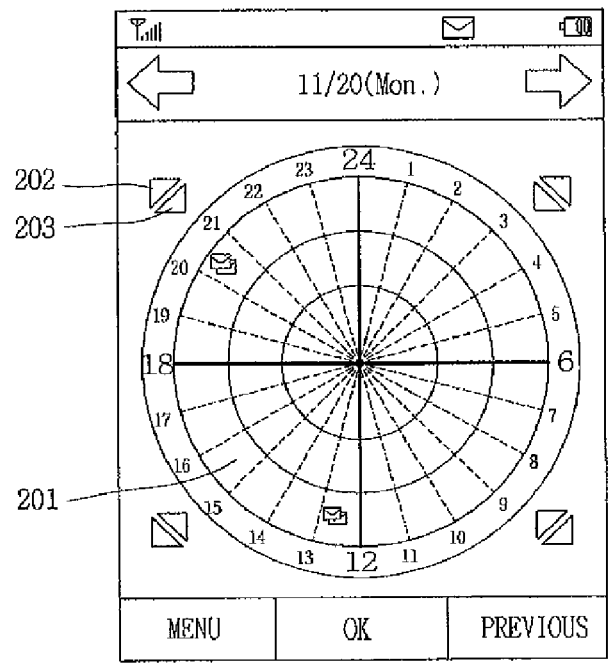
FIGS. 7A and 7B are exemplary views illustrating the circular multi time graphic according to one embodiment of the present invention.
Figure 7B:
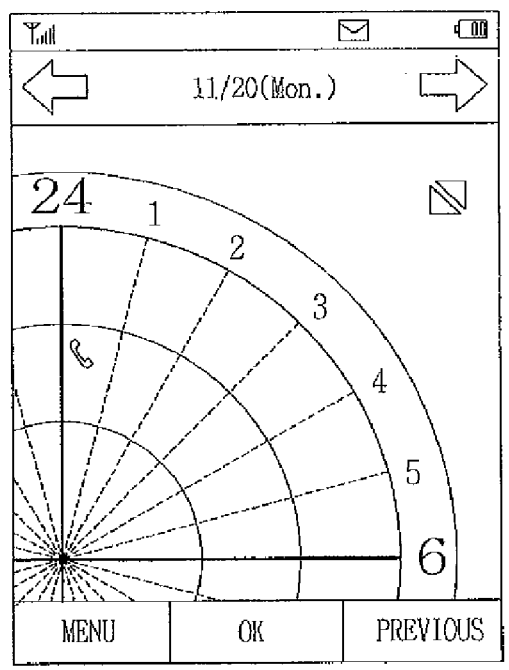

FIGS. 7A and 7B are exemplary views illustrating the circular multi time graphic according to one embodiment of the present invention.

As shown in FIG. 7A, the multi time graphic is formed of time graphics divided into a plurality of quadrants 201 (e.g., time graphics divided into 4 quadrants). A magnification key 202 and a reduction key 203 may be separately displayed in each of the quadrants 201.

As shown in FIG. 7B, when the user selects the magnification key 202 in one of the quadrants 201 of the multi time graphic, a time graphic corresponding to the quadrant linked to the magnification key 202 is magnified. On the contrary, when the user selects the reduction key 203 in one of the quadrants 201 of the multi time graphic, a time graphic corresponding to the quadrant linked to the reduction key 203 is reduced. Here, the time graphic of the magnified quadrant displays detailed information of icons on the display screen.

Accordingly, by displaying icons located on the time graphic on a magnified quadrant within a limited size of the display screen of the display, the icons located on the magnified quadrant can be displayed in detail.

Hereinafter, description of a method for controlling the multi time graphic according to one embodiment of the present invention will be given in detail with reference to FIG. 8.

Figure 8:
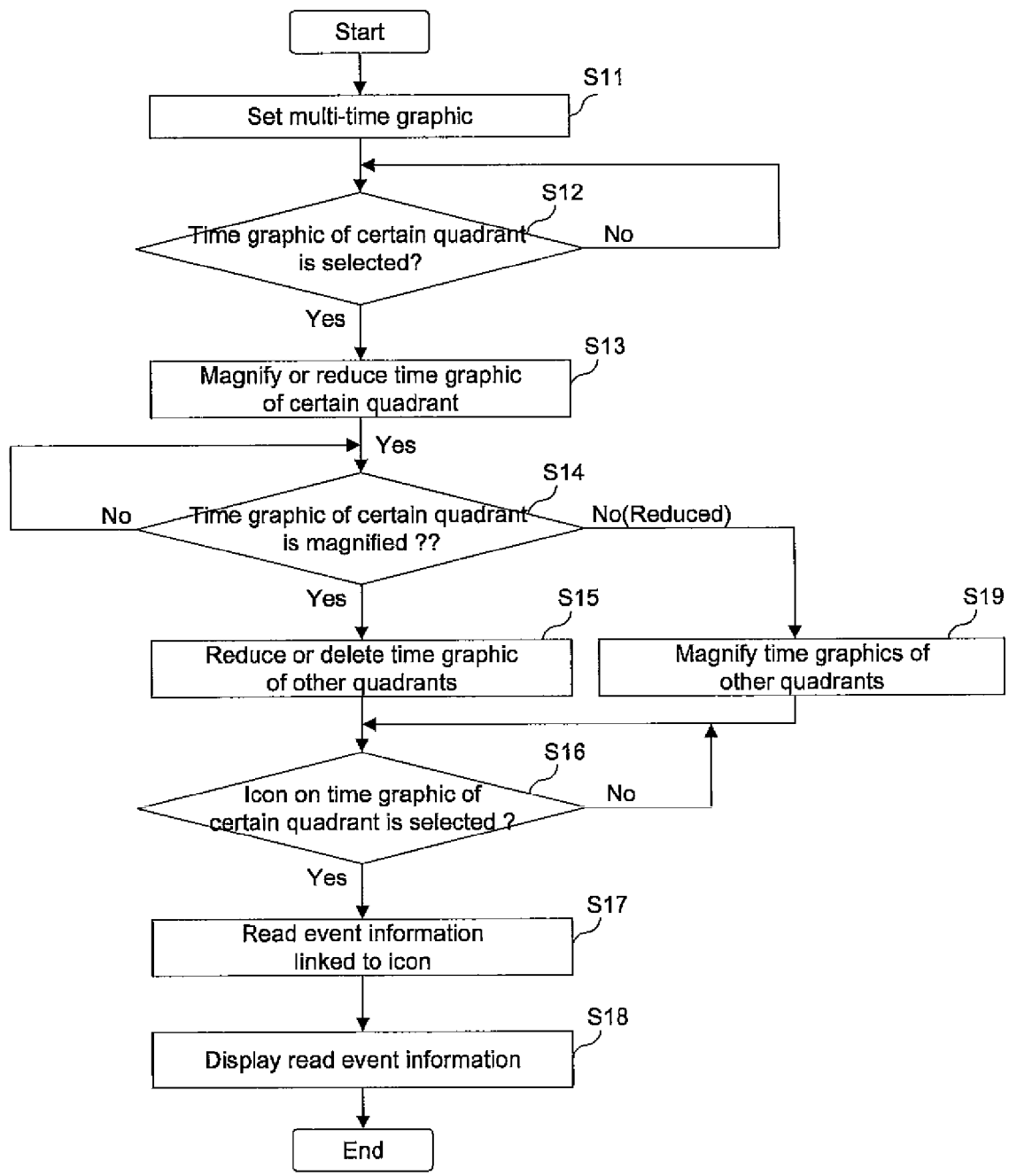
FIG. 8 is a flowchart illustrating an event display method for a mobile terminal according to one embodiment of the present invention.

FIG. 8 is a flowchart illustrating an event display method for a mobile terminal according to one embodiment of the present invention.

First, the control unit 180 sets a time graphic displayed on a screen of the display module 151 as a time graphic having a plurality of quadrants (multi time graphic) at step S11. The multi time graphic may be set to have a plurality of quadrants, and the user may determine the number of quadrants of the time graphic. For instance, if a time graphic having 4 quadrants is selected by the user, the control unit 180 reads multi time graphic data having 4 quadrants among a plurality of multi time graphic data which are pre-stored in the storage unit 160, and then outputs the read multi time graphic data having 4 quadrants to the display module 151.

The display module 151 receives the read multi time graphic data having 4 quadrants, and displays the received multi time graphic data having 4 quadrants on the display screen.

The control unit 180 determines whether or not the time graphic of a particular quadrant (e.g., time graphic of a first quadrant) of the multi time graphic is selected by the user at step S12. Here, the control unit 180 can determine, via the touch screen or the direction keys of the mobile terminal, whether or not the time graphic of the certain quadrant is selected by the user.

When the time graphic of the certain quadrant of the multi time graphic is selected, the control unit 180 magnifies or reduces the size of the selected time graphic at step S13. For instance, when the time graphic of the particular quadrant of the multi time graphic is clicked for a preset period of time (e.g., 0.5 sec.) via the touch screen, the control unit 180 magnifies or reduces the size of the selected time graphic. Further, when the time graphic of the particular quadrant of the multi time graphic is clicked for a preset period of time (e.g., 1 sec.) via the touch screen, the control unit 180 reduces or magnifies the size of the selected time graphic. Here, when a central portion of the multi time graphic is clicked for a preset period of time (e.g., 0.5 sec.) via the touch screen, the control unit 180 magnifies or reduces the entire multi time graphic. Also, when the central portion of the multi time graphic is clicked for a preset period of time (e.g., 1 sec.) via the touch screen, the control unit 180 reduces or magnifies the entire multi time graphic.

Meanwhile, if a first key (e.g., a "confirmation key") is selected after a time graphic of a particular quadrant of the multi time graphic is selected by the direction keys, the control unit 180 magnifies or reduces the size of the selected time graphic. And, if a second key (e.g., a "cancellation key") is selected, the selected time graphic may be reduced or magnified.

When the time graphic of the particular quadrant (e.g., time graphic of a first quadrant) of the multi time graphic is magnified at step S14, the control unit 180 reduces or deletes time graphics of other remaining quadrants (e.g., time graphics of second to fourth quadrants) at step S15. Here, the control unit 180 displays an icon(s) located on the magnified time graphic of the first quadrant in detail, thereby enabling the user to easily check the icon(s) located on the magnified time graphic of the first quadrant.

Then, the control unit 180 determines whether or not a specific icon located on the magnified time graphic of the first quadrant is selected by the user at step S16.

If a specific icon is selected by the user, the control unit 180 reads event information linked to the specific icon from the storage unit 160, and then outputs the read event information to the display module 151 at step S17. Here, when a cursor is located on the specific icon (e.g., an icon linked to a text message), the control unit 180 may display summary information of the specific icon through a pop-up window on the display module 151. Further, when the specific icon is clicked by the user, the control unit 180 may display detailed information of the specific icon on the display module 151.

The display module 151 receives the read event information, and displays the received event information on the display screen at step S18. Accordingly, the user may easily select and check icon(s) located on the time graphic of the magnified quadrant.

When the size of the time graphic (e.g., time graphic of the first quadrant) of the particular quadrant of the multi time graphic is reduced at step S14, the control unit 180 magnifies the time graphics of the other remaining quadrants (e.g., time graphics of the second to fourth quadrants) at step S19. Here, the control unit 180 displays icon(s) located on the magnified time graphics of the second to fourth quadrants in detail, thereby enabling the user to easily check the icon(s) located on the magnified time graphics of the second to fourth quadrants.

Here, in order to enhance visual effects, the control unit 180 may gradually reduce the size of the time graphic of the specific quadrant (e.g., time graphic of the first quadrant), and simultaneously, may gradually magnify the size of the time graphics of the remaining quadrants (e.g., time graphics of the second to fourth quadrants). Further, in order to enhance visual effects, the control unit 180 may gradually magnify the size of the time graphic of the specific quadrant (e.g., time graphic of the first quadrant), and simultaneously, may gradually reduce the size of the time graphics of the remaining quadrants (e.g., time graphics of the second to fourth quadrants).

Hereinafter, description of the process of magnifying the multi time graphic according to one embodiment of the present invention will be given in detail with reference to FIGS. 5, 9A through 9E.

FIGS. 9A through 9E are exemplary views respectively showing a process of magnifying a multi time graphic according to one embodiment of the present invention.

Figure 9A:
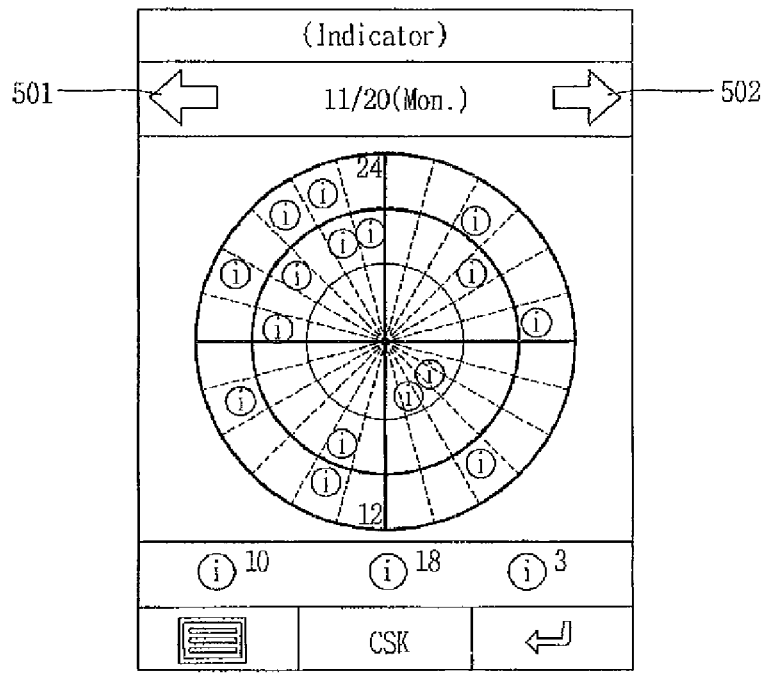
FIGS. 9A through 9E are exemplary views respectively showing a process of magnifying a multi time graphic according to one embodiment of the present invention.

As shown in FIG. 9A, when one of icons (i) displayed on the multi time graphic is selected by the user, the control unit 180 displays event information ID linked to the selected icon on the display screen. For instance, when the icon selected by the user is an icon linked to the call reception events, the control unit 180 displays the number of times of call reception (e.g., 10) on the display screen. When the icon selected by the user is an icon linked to the call transmission events, the control unit 180 displays the number of times of call transmission (e.g., 18) on the display screen. When the icon selected by the user is an icon linked to the message reception events, the control unit 180 displays the number of times of message reception (e.g., 3) on the display screen.

The control unit 180 may count the number of times that events occur for one day according to the type of the events, and display the counted number of times that the events have occurred on the display screen. For instance, when the icon selected by the user is an icon linked to the call reception events, the control unit 180 counts the number of times of call reception occurring in real-time, and then displays the counted number of times of call reception on the display screen.

Figure 9B:
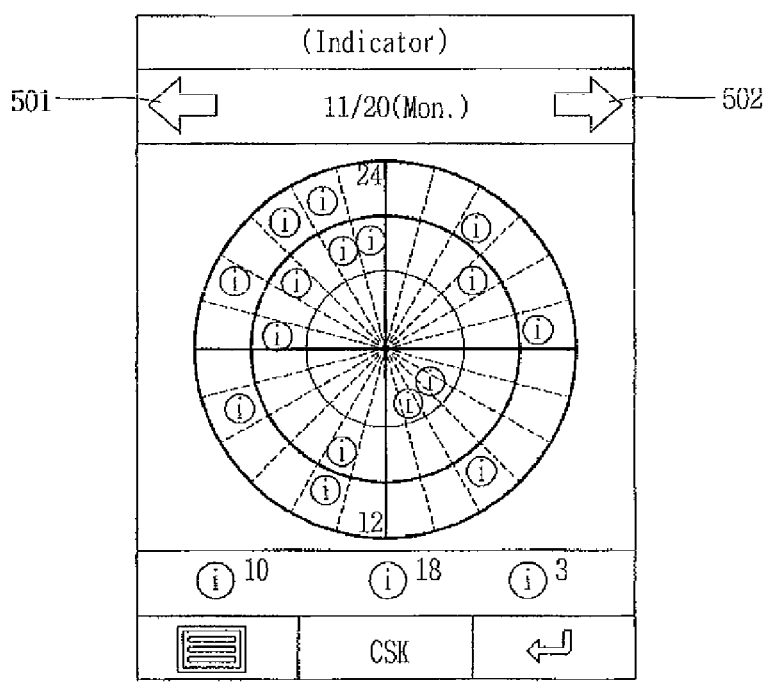

As shown in FIG. 9B, when a time graphic of a particular quadrant of the multi time graphic (e.g., time graphic of the first quadrant) is selected, the control unit 180 changes the color of the time graphic of the selected particular quadrant into a pre-set color (e.g., translucent yellow). When the specific time graphic of the multi time graphic is selected, the control unit 180 may change the shape of the selected time graphic (e.g., tilt, drift and spotlight effects may be applied to the selected time graphic). Here, when the time graphic of the specific quadrant of the multi time graphic (e.g., time graphic of the first quadrant) is selected, the control unit 180 may change the color and shape of the time graphic of the selected quadrant into various colors and shapes.

In addition, when a time graphic of a specific quadrant of the multi time graphic (e.g., time graphic of the first quadrant) is selected, the control unit 180 may output sound effects or vibrate the mobile terminal. For instance, when the time graphic of the specific quadrant of the multi time graphic (e.g., time graphic of the first quadrant) is selected, the control unit 180 applies a control signal to a vibration unit (not shown) within the mobile terminal. Here, the vibration unit serves to vibrate the mobile terminal based on the control signal.

Figure 9C:
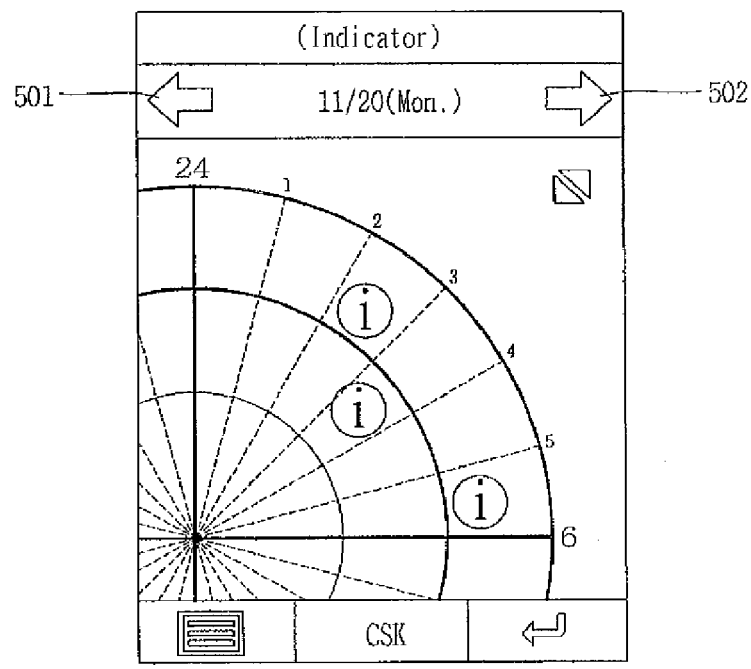

As shown in FIG. 9C, when the magnification key 202 linked (adjacent) to a time graphic of the specific quadrant of the multi time graphic (e.g., time graphic of the first quadrant) is selected, the control unit 180 magnifies the time graphic of the selected specific quadrant. Here, the control unit 180 magnifies the size of the time graphic of the specific quadrant of the multi time graphic (e.g., time graphic of the first quadrant), and simultaneously, deletes the time graphics of the other remaining quadrants (e.g., time graphics of the second to fourth quadrants). Accordingly, the magnified time graphic of the first quadrant only is displayed on the screen display of the display module 151.

Figure 9D:
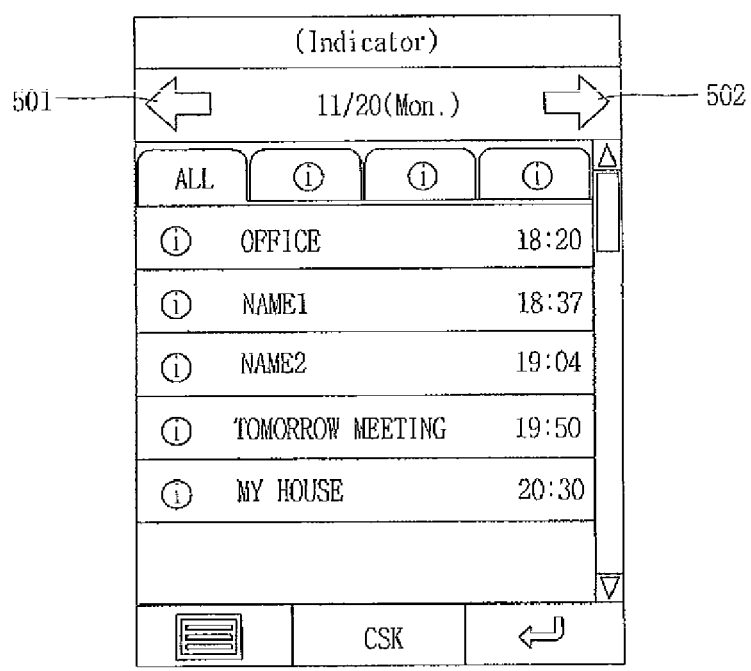

As shown in FIG. 9D, when the time graphic of the magnified specific quadrant is selected, the control unit 180 displays event information linked to icons displayed on the selected time graphic on the display screen. For instance, when the icons displayed on the time graphic of the magnified specific quadrant are icons related to messages, call reception/transmission, and schedules, the control unit 180 displays event information linked to the message icon (e.g., contents of the message), event information linked to the call reception/transmission icon (e.g., names of caller/call recipient and telephone numbers) and event information linked to the schedule icon (e.g., schedule information) on the display screen. Here, if a scroll bar 503 moves in upper and lower directions, the control unit 180 displays event information that are not displayed on the display screen, among event information linked to the icons displayed on the selected time graphic.

If the scroll bar 503 moves in an upper or lower direction, the control unit 180 may sequentially display event information corresponding to the past or the future time on the display screen. For instance, when the scroll bar 503 moves in the upper direction, the control unit 180 is configured to sequentially display event information corresponding to the past time on the display screen. When the scroll bar 503 moves in the lower direction, the control unit 180 is configured to sequentially display event information corresponding to the future time on the display screen.

Figure 9E:
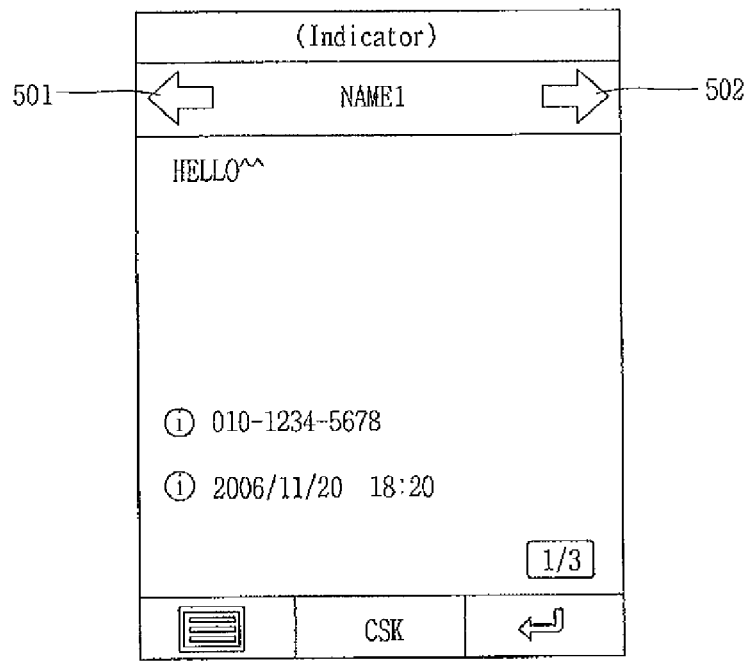

As shown in FIG. 9E, when one of the icons is selected among the icons displayed on the time graphic of the magnified specific quadrant, the control unit 180 displays event information linked to the selected certain icon on the display screen. For instance, when the message icon is selected among the icons displayed on the time graphic of the magnified specific quadrant, the control unit 180 may display the contents of the message linked to the message icon, a telephone number and date/time of message reception at a lower end of the time graphic of the magnified specific quadrant, or display such information on the entire screen display of the display module 151.

Hereinafter, description of the method for displaying a multi time graphic corresponding to the past, the present and the future time will be given in detail with reference to FIGS. 5, 10A and 10B.

Figure 10A:
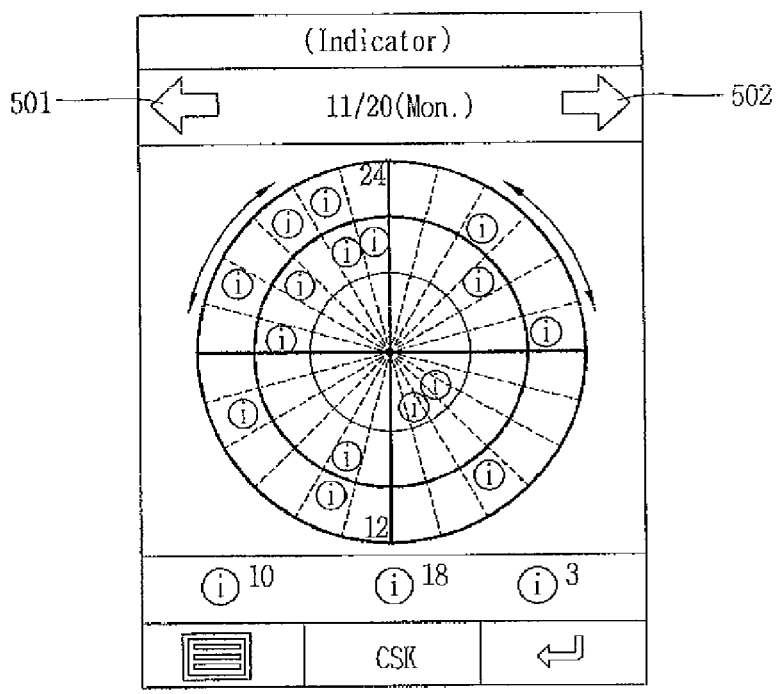
FIGS. 10A and 10B are views illustrating a method for displaying a multi time graphic corresponding to the past, the present and the future time according to one embodiment of the present invention.
Figure 10B:
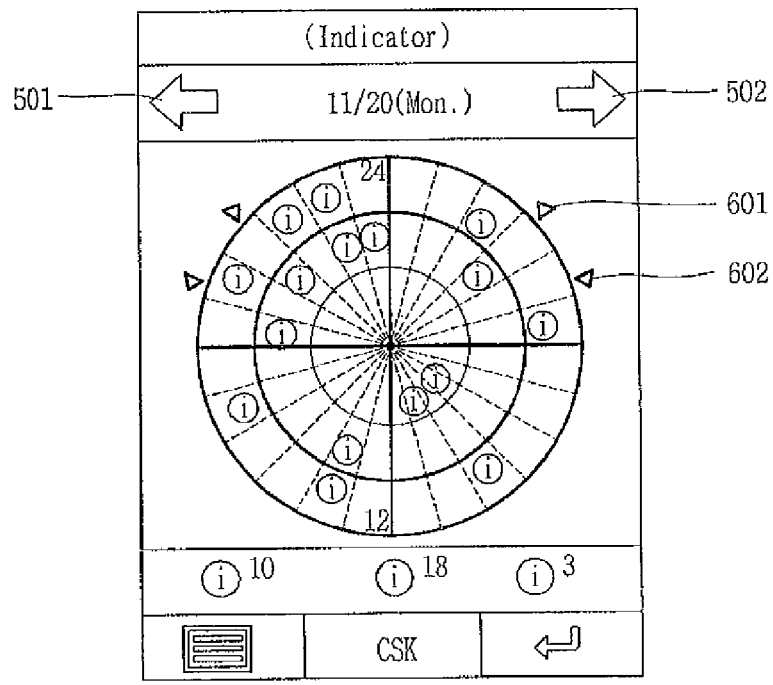

FIGS. 10A and 10B are views illustrating a method for displaying a multi time graphic corresponding to the past, the present and the future time according to one embodiment of the present invention.

As shown in FIG. 10A, when the multi time graphic is dragged (or rotated) in a clockwise or counter-clockwise direction via the touch screen, the control unit 180 reads a multi time graphic that matches to the past or the future time from the storage unit 160, and then displays the read multi time graphic on the screen display of the display module 151. For instance, if the multi time graphic is dragged (or rotated) from the position of 1:00 to the position of 3:00 (2-hour movement) in a clockwise direction via the touch screen, the control unit 180 reads a multi time graphic indicating prior to 2 hours from the storage unit 160, and then displays the read multi time graphic on the display screen of the display module 151. If the multi time graphic is dragged (or rotated) from the position of 1:00 to the position of 3:00 (2-hour movement) in a counter-clockwise direction via the touch screen, the control unit 180 reads a multi time graphic indicating after 2 hours from the storage unit 160, and then displays the read multi time graphic on the display screen of the display module 151.

When a certain time graphic of the multi time graphic (e.g., time graphic of the first quadrant) is dragged (or rotated) in a clockwise or counter-clockwise direction via the touch screen, the control unit 180 may read a time graphic that matches to the past or the future time of the specific time graphic from the storage unit 160, and then display the read time graphic on the display screen of the display module 151. For instance, when the time graphic of the first quadrant of the multi time graphic is dragged (or rotated) from the position of 1:00 to the position of 3:00 (2-hour movement) in a clockwise direction via the touch screen, the control unit 180 reads the time graphic of the first quadrant corresponding to the time period from 1:00 to 3:00, which represents yesterday, from the storage unit 160, and then displays the read time graphic of the first quadrant on the display screen of the display module 151. When the time graphic of the first quadrant of the multi time graphic is dragged (or rotated) from the position of 1:00 to the position of 3:00 (2-hour movement) in a counter-clockwise direction via the touch screen, the control unit 180 reads the time graphic of the first quadrant corresponding to the time period from 1:00 to 3:00, which represents tomorrow, from the storage unit 160, and then displays the read time graphic of the first quadrant on the display screen of the display module 151.

As shown in FIG. 10, when date keys 501, 502 of the multi time graphic are selected, the control unit 180 reads the past multi time graphic or the future multi time graphic from the storage unit 160, and displays the read past multi time graphic or future multi time graphic on the display screen of the display module 151. For instance, whenever the date key 501 is selected, the control unit 180 reads the past multi time graphic (e.g., a multi time graphic corresponding to yesterday's date) from the storage unit 160, and displays the read multi time graphic on the display screen of the display module 151. Whenever the date key 502 is selected, the control unit 180 reads the future multi time graphic (e.g., a multi time graphic corresponding to tomorrow's date) from the storage unit 160, and displays the read multi time graphic on the display screen of the display module 151.

When a past indication key 601 and a future indication key 602, which are located on a specific time graphic of the multi time graphic, are selected, the control unit 180 reads a past time graphic of the specific time graphic or a future time graphic of the specific time graphic from the storage unit 160, and then displays the read past time graphic or the future time graphic on the display screen of the display module 151. For instance, whenever the past indication key 601 located on the specific time graphic is selected, the control unit 180 reads the past time graphic of the specific time graphic (e.g., time graphic corresponding to yesterday's date), and displays the read past time graphic on the display screen of the display module 151. Whenever the future indication key 602 located on the specific time graphic is selected, the control unit 180 reads the future time graphic of the specific time graphic (e.g., time graphic corresponding to tomorrow's date) from the storage unit 160, and displays the read future time graphic on the display screen of the display module 151.

Meanwhile, when the multi time graphic is dragged (or rotated) in a clockwise or counter-clockwise direction via the touch screen, the control unit 180 may magnify or reduce the size of the multi time graphic. For instance, when the multi time graphic is dragged (or rotated) in a clockwise direction via the touch screen, the control unit 180 magnifies the size of the multi time graphic. When the multi time graphic is dragged (or rotated) in a counter-clockwise direction via the touch screen, the control unit 180 reduces the size of the multi time graphic.

When the multi time graphic is dragged in a left or right direction via the touch screen, the control unit 180 may display the past multi time graphic or the future multi time graphic on the display screen. For instance, when the multi time graphic is dragged in a right direction via the touch screen, the control unit 180 reads a past multi time graphic of the multi time graphic from the storage unit 160, and then displays the read past time graphic on the display screen of the display module 151. When the multi time graphic is dragged in a left direction via the touch screen, the control unit 180 reads a future multi time graphic of the multi time graphic from the storage unit 160, and then displays the read future time graphic on the display screen of the display module 151. Here, the control unit 180 may display the past or the future multi time graphic on the display screen of the display 151 through a slide show function (effect) or a page turn function (effect).

Hereinafter, description of the event information display method by using a graph will be given in detail with reference to FIGS. 5 and 11A through 11H.

FIGS. 11A through 11H are exemplary views respectively illustrating information of detected events in a cylindrical graph according to one embodiment of the present invention. Here, the control unit 180 may display detected event information according to one embodiment of the present invention not only using a cylindrical graph, but also using a bar graph, a pie chart, and the like.

Figure 11A:
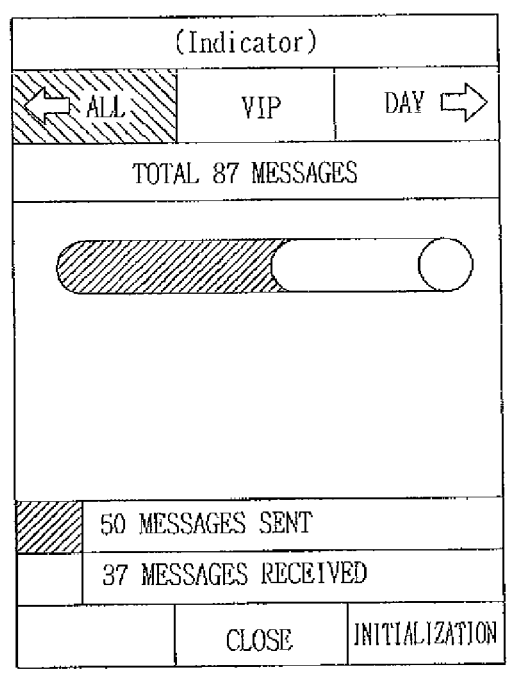

As shown in FIG. 11A, the control unit 180 counts the number of times of sending/receiving messages, and when the user selects an item showing the number of times of generating messages, displays the counted number of times of sending/receiving messages in a cylindrical graph. The control unit 180 counts the number of times of originating/receiving (incoming) calls, and when the user selects an item indicating the number of times of generating calls, displays the counted number of times of originating/receiving (incoming) calls in the cylindrical graph on the display screen.

Figure 11B:
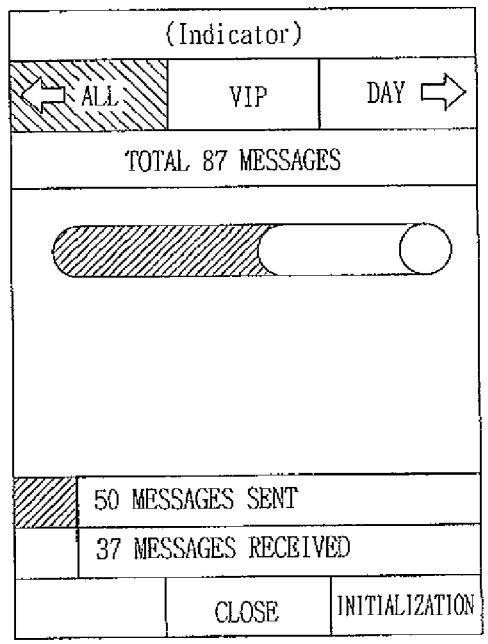

As shown in FIG. 11B, the control unit 180 counts call time, and when an item showing call time is selected by the user, displays the counted call time in a cylindrical graph. Here, the control unit 180 may display originating call time and receiving call time, separately.

Figure 11C:
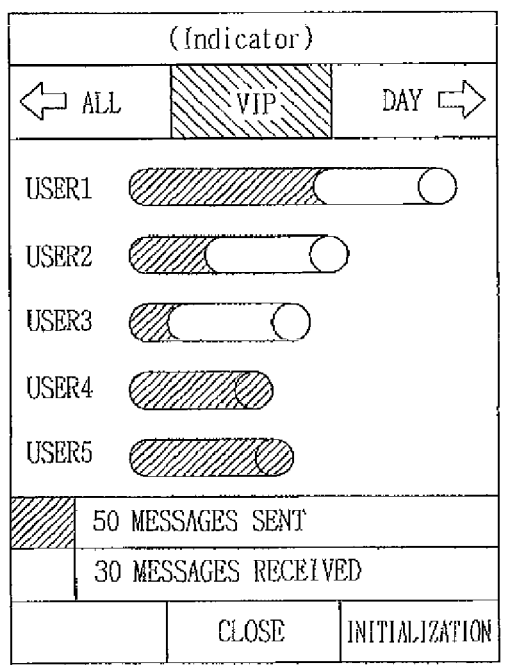

As shown in FIG. 11C, when a VIP item is selected by the user after the item indicating the number of times of generating messages is selected, the control unit 180 counts the number of times of receiving/sending messages in the order of user names, and then displays the counted number of times of sending/receiving messages in a cylindrical graph. Here, when a certain name is selected among the cylindrical graphs displayed in the order of user names, the control unit 180 may separately display the number of times of sending messages and the number of times of receiving the messages on the display screen.

Figures 11D, 11E:
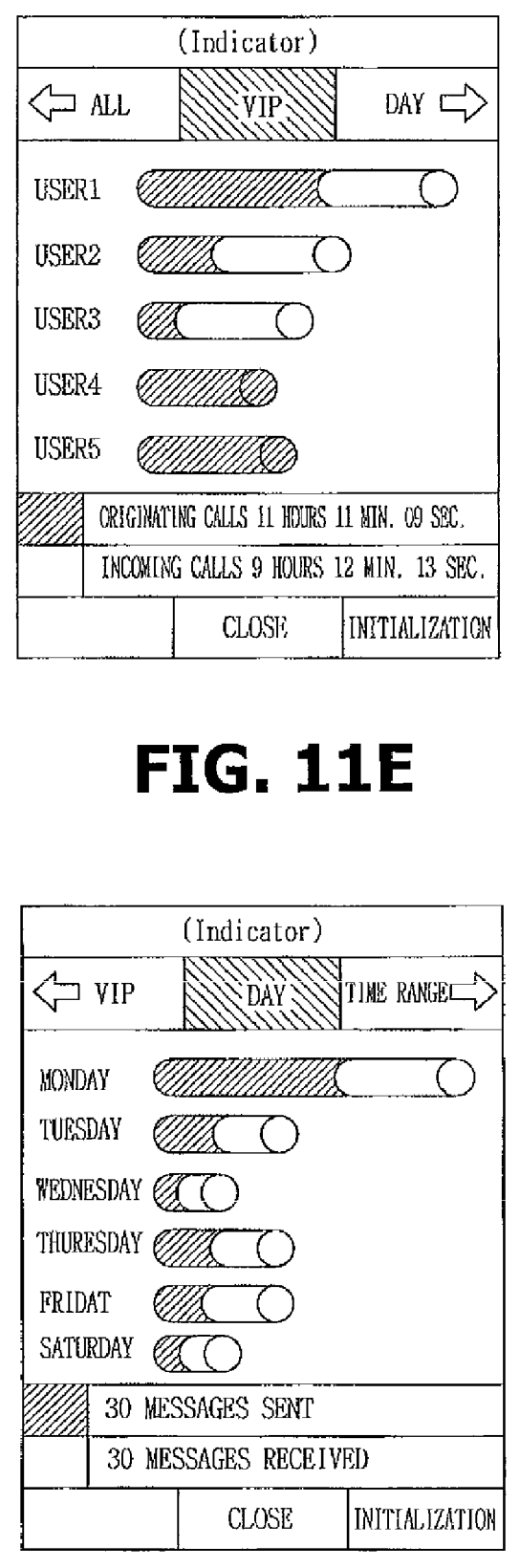

As shown FIG. 11D, when the VIP item is selected by the user after the call time item is selected, the control unit 180 counts the call time in the order of user names, and displays the counted call time in the cylindrical graph. Here, when a particular name is selected among the cylindrical graphs displayed in the order of user names, the control unit 180 may separately display originating call time and receiving (incoming) call time of the selected name on the display screen.

As shown in FIG. 11E, when a "day" item is selected by the user after the item indicating the number of times of generating messages is selected, the control unit 180 counts the number of times sending/receiving messages in the order of days, and displays the counted number of times of sending/receiving messages in a cylindrical graph. Here, when a particular day is selected among the cylindrical graphs displayed in the order of days, the control unit 180 may separately display the number of times of sending messages and receiving messages on the selected particular day on the display screen.

As shown in FIG. 11F, when the "day" item is selected after the call time item is selected by the user, the control unit 180 counts call time in the order of days, and then displays the counted call time in a cylindrical graph. Here, when a particular day is selected among the cylindrical graphs displayed in the order of days, the control unit 180 may separately display originating call time and receiving call time on the selected day on the display screen.

As shown in FIG. 11G, when a time range (interval, period) item is selected after the item indicating the number of times of generating messages is selected by the user, the control unit 180 counts the number of times of sending/receiving messages in the order of time ranges (e.g., 6:00~9:00; 9:00~12:00; 12:00~15:00; 15:00~18:00; 18:00~21:00), and then displays the counted number of times of sending/receiving messages in the cylindrical graph. Here, when a particular time range is selected among the cylindrical graphs displayed in the order of time ranges (e.g., 6:00~9:00), the control unit 180 may separately display the number of times of sending messages and the number of times of receiving messages, which correspond to the selected particular time range, on the display screen.

Figure 11H:

As shown in FIG. 11H, when the time range item is selected after the call time item is selected by the user, the control unit 180 counts call time in the order of time ranges, and then displays the counted call time in a cylindrical graph. Here, when a particular time range is selected among the cylindrical graphs displayed in the order of time ranges, the control unit 180 may separately display the originating call time and the receiving call time, which correspond to the selected particular time range, on the display screen.

Hereinafter, description of the method for protecting personal information (event information) by requiring a password before displaying event information will be given in detail with reference to FIGS. 5 and 12.

Figure 12:
FIG. 12 is an exemplary view illustrating a window requesting a password before displaying information of a detected event according to one embodiment of the present invention.

FIG. 12 is an exemplary view illustrating a pop-up window requesting a password before displaying information of a detected event according to one embodiment of the present invention.

As shown in FIG. 12, when a particular icon is selected among icons displayed on the multi time graphic, the control unit 180 displays a window requesting a password before displaying event information linked to the selected icon on the display screen, and then when a password inputted to the displayed window is identical to a pre-stored password, displays event information linked to the particular icon on the display screen.

As described so far, the event display apparatus and method for a mobile terminal according to one embodiment of the present invention displays events occurring in the mobile terminal on the multi time graphic (divided into a plurality of time graphics), thereby enabling the user to easily check and manage the events.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An event display method for a mobile terminal, comprising:
    detecting at least one or more events in a mobile terminal;
    displaying a multi time graphic divided into a plurality of time graphics on a display screen;
    locating the detected events on the multi time graphic; and
    displaying another multi time graphic representing the past or the future time on the display screen based on an input conducted in a clockwise or counterclockwise direction.

2. The method of claim 1, wherein the multi time graphic is a plurality of time graphics divided into a plurality of quadrants.

3. The method of claim 1, further comprising:
    magnifying or reducing at least one or more of the plurality of time graphics.

4. The method of claim 1, wherein the input is corresponding to dragging via a touch screen.

5. The method of claim 1, further comprising:
    displaying a window requesting a password on the display screen when the event is selected by a user; and
    displaying information of the selected event on the display screen when a password inputted to the displayed window is identical to a pre-stored password.

6. An event display apparatus for a mobile terminal, comprising:
    a sensing unit which senses at least one or more events in a mobile terminal; and
    a control unit which displays a multi time graphic divided into a plurality of time graphics on a display screen, and locates the detected events on the multi time graphic,
    wherein the control unit displays another multi time graphic representing the past or the future time on the display screen based on an input conducted in a clockwise or counterclockwise direction.

7. The apparatus of claim 6, wherein the multi time graphic is a plurality of time graphics divided into a plurality of quadrants.

8. The apparatus of claim 6, wherein the controller magnifies or reduces at least one or more of the plurality of time graphics.

9. The apparatus of claim 6, wherein the input is corresponding to dragging via a touch screen.

10. The apparatus of claim 6, wherein the control unit magnifies or reduces the multi time graphic when the multi time graphic is dragged in a left or right direction via the touch screen.

* * * * *